2,803,544

COLOUR COUPLERS FOR USE IN COLOUR PHOTOGRAPHY

Colin W. Greenhalgh, Blackley, Manchester, England, assignor to Imperial Chemical Industries Limited, a corporation of Great Britain No Drawing. Application February 8, 1954, Serial No. 408,989

Claims priority, application Great Britain February 13, 1953

6 Claims. (Cl. 96—100)

This invention relates to new colour couplers for use in colour photography.

In colour photographic processes in which reducible silver salt images are developed with a primary aromatic amino developing agent in the presence of colour couplers, to form coloured images, difficulties are experienced because the available colour couplers do not, in general, form dyestuffs which possess the correct light absorption characteristics. Numerous pyrazolone derivatives and cyanoacetyl compounds have been proposed for use as colour couplers for the formation of magenta dyestuff images but no completely satisfactory compound has yet been found and accordingly, to obtain good colour fidelity in reproduction, it has been found necessary to introduce into the colour photographic process one or more of various techniques for colour correction, for example by forming a colour correcting masking image to compensate for the undesired absorption of the magenta dyestuff.

The most serious disadvantages of the magenta colour couplers in general use in colour photography is that the magenta dyestuffs formed on development with the usual aromatic amino colour developers such as, for example, p-N:N-diethylaminoaniline, do not satisfactorily transmit light in the blue part of the spectrum, and the residual magenta colour couplers in the film give rise to a yellow stain on storage or exposure to light.

I have now discovered a group of pyrazolone derivatives as hereinafter defined which are superior to the conventionally used pyrazolone colour formers in their transmission of blue light, and which do not develop any appreciable yellow stain on storage or exposure to light.

According to my invention I provide new colour couplers of the formula:

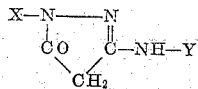

wherein X is an aryl radical and Y is an alkyl, aralkyl or cycloalkyl radical, their enol-sulphato derivatives and their derivatives carrying in the 4-position, a substituent which is replaceable during colour development.

The aryl radical X may carry substituents for example, sulphonic acid, alkyl-, alkyloxy-aryloxy, nitro, or cyano groups or halogen atoms.

According to a further feature of my invention I provide a process for the manufacture of new colour couplers of the above formula which comprises treating a 1-aryl-3-amino-5-pyrazolone with a primary amine of the formula NH$_2$—Y wherein Y is an alkyl, aralkyl, or cycloalkyl radical.

The reaction may be carried out conveniently by heating the reagents together in a suitable diluent. As the diluent it is preferred to use an organic carboxylic acid which is liquid at the temperature of the reaction, for example, acetic acid or a high boiling neutral solvent for example 2-ethoxyethanol.

As examples of suitable 1-aryl-3-amino-5-pyrazolones for use as starting materials for the reaction there may be mentioned 1-phenyl-3-amino-5-pyrazolone and its derivatives carrying one or more substituents, for example, nitro, alkyl, alkyloxy or cyano groups or halogen atoms in the phenyl nucleus and as examples of primary amines there may be mentioned methyl-, butyl-, benzyl-, cyclohexyl-, dodecyl- or octadecyl-amines. A hydroxy-amine, for example β-hydroxyethylamine or a diamine, for example ethylene-diamine may be used as the primary amine and when a carboxylic acid for example acetic acid is present in the reaction mixture the hydroxyl group or the second amino group may be acylated during the reaction.

If desired the product obtained by treating a 1-aryl-3-amino-5-pyrazolone with a primary amine may be further treated to obtain the final colour coupler to be used in the gelatino silver halide emulsion. For example, when the aryl nucleus contains a hydroxy group, this can be subsequently substituted, for example by acylation, and when the aryl nucleus contains a nitro group this can be subsequently reduced and acylated for example with an acyl radical which contains a group which renders the colour coupler fast to diffusion such as the octadecenyl-succinyl-group. Alternatively the aryl group may be sulphonated, for example by treating it with 80% sulphuric acid. However when a 1-aryl-3-substituted amino-5-pyrazolone is treated with 20% oleum at a temperature between —10 and 0° C. a disulphonated derivative is obtained in which one sulphonic acid group is attached to the aryl nucleus and the other is attached to the 5-position of the pyrazolone nucleus to form a sulphate ester of the enol form of the pyrazolone. These 5-enol sulphato pyrazolones are useful as colour couplers, the sulphato group being split off on colour development.

By a substituent in the 4-position which is replaceable during colour development we mean a substituent which is known from the literature to be replaceable from the 4-position of pyrazolone colour formers, during colour development, for example, an azo radical or a benzylidene radical. The pyrazolone derivatives containing an azo radical or a benzylidene radical in the 4-position may be obtained from the parent pyrazolone by reaction with the appropriate diazonium compound or with the appropriate benzaldehyde respectively.

The new colour couplers of our invention may be used in the developing solution or they may be included in a light-sensitive layer or in a non-light sensitive layer adjacent to a sensitive layer or separated therefrom by a water-permeable colloid layer.

It is a preferred feature of my invention, however, to include the new colour couplers of our invention in a light-sensitive gelatino-silver halide emulsion layer which forms part of a multilayer film or paper of the kind used for colour photography. For this purpose it is preferred to use those new colour couplers which contain a solubilising group and a substituent rendering them fast to diffusion, for example and alkyl chain containing at least 5 carbon atoms.

The multilayer film may be a natural order subtractively coloured negative in which the images are to be formed in colours complementary to those of the original object or one in which an unnatural order is used, for example, one in which in the top layer there is formed a yellow image of the blue parts of the object, in one of the two lower layers there is formed a cyan image of the green parts of the object and in the other, a magenta image of the red parts of the objects.

Although the colour couplers of my invention give a colour fidelity superior to that obtained with the conventionally used pyrazolone colour couplers they may if desired be used in combination with a black and white or coloured colour correcting masking image for example an azo masking image or a styryl masking image formed after colour development, for example by the process of British specification No. 651,059 or by using a coloured colour coupler for example by the process of British specification No. 673,091, and according to a further feature of my invention I provide a gelatino-silver halide emulsion layer carrying a derivative of a colour coupler as hereinbefore defined which carries as substituent in the 4-position a radical which is replaceable during colour development. The replaceable substituent may be for example an azo radical or a substituted or unsubstituted benzylidene (styryl) radical.

The invention is illustrated but not limited by the following examples in which the parts are by weight.

Example 1

A mixture of 5 parts of 1-phenyl-3-amino-5-pyrazolone, 10 parts of benzylamine and 30 parts of acetic acid is boiled for 12 hours.

The reaction mixture is cooled and poured into 200 parts of water and the aqueous suspension of the gummy precipitate so formed is stirred for ½ hour. The clear aqueous solution is then poured off and the gummy product is stirred for 10 minutes with 100 parts of water. The clear aqueous solution is poured off and the residue is crystallised from 25 parts of methyl alcohol when 1-phenyl-3-benzylamino-5-pyrazolone is obtained in the form of yellow crystals melting at 130–132° C. The product is obtained in the form of white crystals by recrystallisation from methyl alcohol containing a little hydrazine hydrate. On analysis the product is found to contain 72.8% carbon and 5.9% of hydrogen (calculated for $C_{16}H_{16}ON_3$, carbon=72.45% and hydrogen=5.7%).

Example 2

A mixture of 5 parts of 1-phenyl-3-amino-5-pyrazolone, 10 parts of n-butylamine and 30 parts of acetic acid is boiled for 3 hours.

The reaction mixture is cooled to 50° C. and diluted with a mixture of 25 parts of methyl alcohol and 50 parts of water and then allowed to stand. The pale brown crystals of 1-phenyl-3-n-butylamino-5-pyrazolone which separate are filtered off and washed twice with 50% aqueous methyl alcohol when a crystalline product melting at 120° C. is obtained. On analysis the product is found to contain 67.2% of carbon, 7.2% of hydrogen and 17.7% of nitrogen (calculated for $C_{13}H_{18}ON_3$: carbon=67.45%, hydrogen=7.4% and nitrogen=18.15%).

Example 3

A mixture of 4.8 parts of 1-phenyl-3-amino-5-pyrazolone, 10 parts of methylamine acetate and 30 parts of acetic acid is boiled for 3 hours. 20 parts of acetic acid are then distilled off under reduced pressure and the viscous residue is allowed to stand.

The pale yellow product which crystallises out is filtered off and recrystallised from toluene, when 1-phenyl-3-methylamino-5-pyrazolone is obtained in the form of white crystals with melting point of 162–163° C. On analysis the product is found to contain 21.8% of nitrogen (calculated for $C_{10}H_{12}ON_3$, nitrogen=22.2%).

Example 4

A mixture of 10 parts of 1-phenyl-3-amino-5-pyrazolone, 20 parts of cyclohexylamine and 60 parts of acetic acid is boiled for 3½ hours. The reaction mixture is cooled and poured into 200 parts of water. The clear aqueous solution is poured off from the gummy product which is then crystallised from methyl alcohol, when 1-phenyl-3-cyclohexylamino-5-pyrazolone is obtained in the form of white crystals melting at 161–162° C. When analysed the product is found to contain 69.9% of carbon, 7.3% of hydrogen and 16.0% of nitrogen (calculated for $C_{15}H_{20}ON_3$, carbon=70.0%, hydrogen=7.45% and nitrogen=16.35%).

Example 5

A mixture of 22 parts of 1-p-nitrophenyl-3-amino-5-pyrazolone, 50 parts of benzylamine and 220 parts of acetic acid is boiled for 5 hours. The reaction mixture is cooled and poured into a mixture of 1,250 parts of water and 100 parts of 36% hydrochloric acid. The mixture is stirred for ½ hour and the product is then filtered off, washed with water, and crystallised from dioxan. 1-p-nitrophenyl-3-benzylamino-5-pyrazolone is obtained in the form of orange crystals melting at 197–198° C. On analysis the product is found to contain 62.0% of carbon, 4.5% of hydrogen and 18.1% of nitrogen (calculated for $C_{16}H_{14}N_4O_3$, carbon=61.95%, hydrogen=4.55%, and nitrogen=18.05%). A mixture of 3 parts of this pyrazolone derivative, 3 parts of zinc powder, 35 parts of acetic acid and 10 parts of water is boiled for 10 minutes. The reaction mixture is filtered and the filtrate is evaporated under reduced pressure.

The gummy residue which is left is stirred with water and the 1-p-aminophenyl-3-benzylamino-5-pyrazolone so obtained as a pale brown solid is filtered off and dried. The dried solid so obtained is dissolved in 100 parts of ethyl acetate and dry hydrogen chloride is passed into the solution to precipitate the 1-p-aminophenyl-3-benzylamino-5-pyrazolone as the hydrochloride which is then filtered off, washed with a mixture of 3 parts of methyl alcohol and 10 parts of benzene, and then dried. The product is dissolved in 100 parts of water and the solution is stirred while a solution of 3 parts of sodium acetate in 15 parts of water is added slowly. The mixture is stirred for ½ hour and the colourless crystals of 1-p-aminophenyl-3-benzylamino-5-pyrazolone (melting point 168–169° C.) are filtered off and dried. A mixture of 1 part of this product, 1.2 parts of octadecenylsuccinic anhydride and 8 parts of acetic acid is heated to 90–100° C. for 10 minutes. The reaction mixture is cooled and diluted with water and the mixture left to stand when the gummy product solidifies. The solid product so obtained is crystallised from a mixture of acetone and a petroleum fraction distilling between 40 and 60° C. when 1 - p - octadecenylsuccinaminophenyl - 3 - benzylamino-5-pyrazolone is obtained as a waxy solid which melts at 158–160° C.

Example 6

A mixture of 5 parts of 1-phenyl-3-amino-5-pyrazolone, 10 parts of β-hydroxyethylamine and 30 parts of acetic acid is boiled for 4 hours. 20 parts of acetic acid are then distilled off under reduced pressure, the viscous residue is poured into 300 parts of water and the aqueous suspension of the gummy precipitate so formed is stirred for 15 hours, after which time the precipitate has solidified.

The solid product is filtered off and crystallised twice from methyl alcohol when 1-phenyl-3-β-acetoxyethylamino-5-pyrazolone is obtained in the form of colourless needles melting at 144–145° C. On analysis the product is found to contain 59.5% of carbon, 5.7% of hydrogen and 16.3% of nitrogen (calculated for $C_{13}H_{15}O_3N_3$; carbon=59.75%, hydrogen=5.8%, nitrogen=16.1%).

A solution of 2.6 parts of this pyrazolone derivative in 50 parts of 2 N sodium hydroxide solution is boiled for 3 minutes and then cooled to 20° C. The solution is stirred and acidified with acetic acid and 10 parts of crystalline sodium acetate are added. The suspension is stirred for 20 minutes and the product which has crystallised out is filtered off washed with water and finally dried at 40° C. 1-phenyl-3-β-hydroxyethylamino-5-pyrazolone is thus obtained in the form of colourless crystals melting at 148–150° C. When analysed the product is found to contain 60.6% of carbon, 5.9% of hydrogen and 19.1% of nitrogen (calculated for $C_{11}H_{13}O_2N_3$; carbon= 60.25%, hydrogen=6.0%, nitrogen=19.15%).

*Example 7*

A mixture of 20 parts of 1-phenyl-3-amino-5-pyrazolone, 40 parts of ethylene diamine and 160 parts of acetic acid is boiled for 4 hours. The reaction mixture is then cooled and poured into a mixture of 600 parts of water and 60 parts of concentrate hydrochloric acid. The mixture is stirred for 10 minutes and then filtered to remove a small amount of brown solid. The filtrate is saturated with sodium acetate and stirred for 8 hours and the precipitated product is then filtered off and crystallised from 15 parts of a mixture of equal parts ethyl alcohol and water.

1-phenyl-3-β-acetamino-ethylamino-5-pyrazolone so obtained melts at 175–176° C. On analysis the product is found to contain 60.1% of carbon, 6.2% hydrogen and 21.8% of nitrogen (calculated for $C_{13}H_{16}O_2N_4$: carbon= 60.0%, hydrogen=6.2%, and nitrogen=21.5%).

*Example 8*

A mixture of 7 parts of 1-phenyl-3-amino-5-pyrazolone, 11 parts of n-octadecylamine and 50 parts of β-ethoxyethanol is boiled for 48 hours. The reaction mixture is then cooled to 20° C. and poured into 200 parts of water. The mixture is stirred for 10 minutes and the solid in suspension is filtered off and then stirred with a further 200 parts of water. The solid is again filtered off, washed well with water and then dissolved in 200 parts of ethylene dichloride. The ethylene dichloride layer is separated from the aqueous layer and dried by stirring it for 1 hour with 7 parts of anhydrous sodium sulphate. Dry hydrogen chloride is passed through the dried solution for 10 minutes and the n-octadecylamine hydrochloride which is precipitated is filtered off from the ethylene dichloride solution which is then washed with 400 parts of water in four portions, dried with 7 parts of anhydrous sodium sulphate and then evaporated to dryness. The tarry residue is then crystallised four times from a petroleum fraction boiling between 60° and 80° C. when 1-phenyl-3-n-octadecylamino-5-pyrazolone is obtained in the form of colourless crystals melting at 84–85° C. On analysis the product is found to contain 76.1% of carbon, 10.1 parts of hydrogen and 9.7% of nitrogen (calculated for $C_{27}H_{45}ON_3$; carbon=75.85%, hydrogen=10.1% and nitrogen=9.7%).

*Example 9*

A mixture of 3 parts of the pyrazolone derivative obtained in Example 8 and 42 parts of 80% sulphuric acid is stirred and heated to 120° C. during 15 minutes. The solution so obtained is stirred at 120–140° C. for 15 minutes and then cooled to 20° C. and poured into a stirred mixture of 50 parts of ice and 50 parts of water. The precipitate which is formed is filtered off, washed with 24 parts of water, and then stirred with 100 parts of acetic acid at 70–75° C. for ½ hour. The reaction mixture is cooled to 40° C., and the solid product is filtered off, washed with 10 parts of acetic acid and finally crystallized from a mixture of 130 parts of methyl alcohol and 30 parts of ethyl acetate. 1-p-sulphophenyl-3-n-octadecylamino-5-pyrazolone is thus obtained in the form of colourless microcrystals melting at 224–226° C. When analysed the product is found to contain 64.2% of carbon, 8.8% of hydrogen, 8.1% of nitrogen and 6.1% of sulphur (calculated for $C_{27}H_{45}O_4N_3S$, carbon=63.85%, hydrogen=8.95%, nitrogen=8.30% and sulphur=6.30%).

*Example 10*

A suspension of 2 parts of 1-p-sulphophenyl-3-n-octadecylamino-5-pyrazolone in 60 parts of acetic acid is heated to 100° C. and 1 part of p-(β,β'-dicyanodiethylamino)-benzaldehyde is added. An orange-red solution is rapidly formed and then an orange micro-crystalline solid separates from the solution. The mixture is cooled to 50° C. and the product is filtered off, washed with ethyl acetate and dried at 100° C. The 1-p-sulphophenyl-3 - n-octadecylamino - 4 - p - (β,β'-dicyanodiethylamino)-benzylidene-5-pyrazolone so obtained melts at 218–221° C.

*Example 11*

1.05 parts of the sodium salt of p-(N-methyl-N-β-sulphoethylamino)-benzaldehyde are added to a boiling solution of 2 parts of 1-p-sulphophenyl-3-n-octadecylamino-5-pyrazolone in a mixture of 50 parts of acetic acid and 50 parts of ethyl alcohol.

After about 2 minutes a red microcrystalline precipitated is formed and the mixture is then cooled to 50° C. The precipitate is filtered off, washed with ethyl acetate and dried at 100° C. The mono sodium salt of 1-p-sulphophenyl - 3 - n - octadecylamino - 4 - p-(N-methyl-N-β-sulphoethylamino)-benzylidene-5-pyrazolone so obtained melts at 266–268° C.

*Example 12*

0.38 part of 2:4-dimethoxybenzaldehyde is added to a boiling suspension of 1 part of 1-p-sulphophenyl-3-n-octadecylamino - 5 - pyrazolone in 30 parts of methyl alcohol. An orange solution is rapidly formed which deposits orange microcrystals after about 2 minutes. The mixture is coooled to 30° C. and the product is filtered off, washed with methyl alcohol and dried at 40° C. The 1 - p - sulphophenyl - 3 - octadecylamino - 4 - (2:4 - dimethoxy) - benzylidene - 5 - pyrazolone so obtained melts at 228–231° C.

*Example 13*

5 parts of 1 - phenyl - 3 - n - octodecylamino - 5 - pyrazolone are added to 19 parts of 20% oleum which is cooled and stirred at −20° C. with good mixing. The mixture is heated to 0° C., stirred at 0° C. for 2–3 minutes and again cooled to −20° C. The mixture is diluted with 200 parts of diethyl ether and the precipitated product is then filtered off, washed three times with 30 parts of diethyl ether and then dissolved in 50 parts of methyl alcohol. To this solution there is added a solution of 3 parts of sodium acetate in 20 parts of methyl alcohol. The product which is precipitated is then filtered off, washed with methyl alcohol and dried. The disodium salt of 1 - p - sulphophenyl - 3 - n - octadecylamino - 5 - sulphatopyrazole so obtained is a white solid melting at 270–280° C. with decomposition. When analysed the product is found to contain 51.1% of carbon, 7.2% of hydrogen, 6.6% of nitrogen and 9.7% of sulphur (calculated for $C_{27}H_{43}O_7N_3S_2Na_2.1H_2O$, carbon =51.7%, hydrogen=7.25%, nitrogen=6.7% and sulphur=10.2%).

*Example 14*

A mixture of 5 parts of 1-(4'-(4''-chlorophenoxy)-phenyl)-3-amino-5-pyrazolone, 4.25 parts of n-octadecylamine and 25 parts of β-ethoxyethanol is boiled for 48 hours. The product is then isolated by the method of isolation described in Example 8. The 1-(4'-4''-chlorophenoxy) - phenyl) - 3 - n - octadecylamino - 5 - pyrazolone so obtained in the form of colourless plate crystals melts at 78–79° C. On analysis the product is found to contain 71.6% of carbon, 8.8% of hydrogen, 7.6% of nitrogen and 7.0% of chlorine (calculated for $C_{33}H_{48}O_2N_3Cl$, carbon = 71.50%, hydrogen = 8.75%, nitrogen=7.60% and chlorine=6.40%).

What I claim is:

1. A light-sensitive gelatino-silver halide emulsion layer containing a colour coupler selected from the group consisting of 1-phenyl-3-benzylamino-5-pyrazolone, 1-phenyl-3-butylamino-5-pyrazolone, 1-phenyl-3-methylamino-5-pyrazolone, 1-phenyl-3-cyclohexylamino-5-pyrazolone, 1-p-nitrophenyl-3-benzylamino-5-pyrazolone, 1-p-aminophenyl-3-benzylamino-5-pyrazolone, 1-p-octadecenyl - succinaminophenyl - 3 - benzylamino - 5 - pyrazolone, 1-phenyl-3-β-acetoxyethylamino-5-pyrazolone, 1-phenyl-3-

β-hydroxy-ethylamino-5-pyrazolone, 1-phenyl-3-β-acetamino-ethyl-amino-5-pyrazolone, 1-phenyl-3-octadecylamino-5-pyrazolone, 1-p-sulphophenyl-3-octadecylamino-5-pyrazolone, 1-p-sulphophenyl-3-octadecylamino-4-p(β,β'-dicyanodiethylamino)-benzylidene-5-pyrazolone, 1-p-sulphophenyl - 3 - octadecylamino - 4 - p - (N - methyl - N - β - sulphoethylamino)-benzylidene-5-pyrazolone and the alkali metal salts thereof, 1-p-sulphophenyl-3-octadecylamino-4-(2,4-dimethoxy)-benzylidene-5-pyrazolone, 1-p-sulphophenyl-3-octadecylamino, 5-sulphatopyrazole, 1-(4'-(4''-chlorophenoxy) - phenyl) 3 - octadecylamino -5 - pyrazolone.

2. A light-sensitive gelatino-silver halide emulsion layer as claimed in claim 1 wherein said colour coupler is 1-phenyl-3-benzylamino-5-pyrazolone.

3. A light-sensitive gelatino-silver halide emulsion layer as claimed in claim 1 wherein said colour coupler is 1-phenyl-3-cyclohexylamino-5-pyrazolone.

4. A light-sensitive gelatino-silver halide emulsion layer as claimed in claim 1 wherein said colour coupler is 1 - p - sulphophenyl - 3 - n - octadecylamino - 5 - pyrazolone.

5. A light-sensitive gelatino-silver halide emulsion layer as claimed in claim 1 wherein said colour coupler is 1 - p - sulphophenyl - 3 - n - octadecylamino - 4 - p - (β,β'-dicyanodiethylamino)-benzylidene-5-pyrazolone.

6. A light-sensitive gelatino-silver halide emulsion layer as claimed in claim 1 wherein said colour coupler is the disodium salt of 1-p-sulphophenyl-3-n-octadecylamino-5-sulphatopyrazole.

References Cited in the file of this patent
UNITED STATES PATENTS

| | | |
|---|---|---|
| 2,608,790 | Bochmuhl et al. | Jan. 26, 1937 |
| 2,109,445 | Kaufmann | Feb. 22, 1938 |
| 2,343,703 | Porter et al. | Mar. 7, 1944 |
| 2,619,419 | Jennen | Nov. 25, 1952 |
| 2,672,417 | Jennen | Mar. 16, 1954 |